(12) United States Patent
Jiang et al.

(10) Patent No.: US 12,566,659 B2
(45) Date of Patent: Mar. 3, 2026

(54) METHODS, DEVICES, AND ELECTRONIC DEVICES FOR LOCATING ANOMALY ROOT CAUSES

(71) Applicant: CHENGDU AIRCRAFT INDUSTRIAL (GROUP) CO., LTD., Sichuan (CN)

(72) Inventors: Min Jiang, Chengdu (CN); Aidi Lei, Chengdu (CN); Xiang Liu, Chengdu (CN); Senshan Ouyang, Chengdu (CN); Shangchao Wang, Chengdu (CN); Chen Chen, Chengdu (CN); Lijuan Tan, Chengdu (CN); Haotian Lu, Chengdu (CN); Quan Qiu, Sichuan (CN); Jianting Sun, Chengdu (CN); Dongwan Fan, Chengdu (CN); Jiali Luo, Chengdu (CN); Xiangfeng Liu, Chengdu (CN); Liji Zhang, Chengdu (CN); Weiyu Zhao, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 19/194,308

(22) Filed: Apr. 30, 2025

(65) Prior Publication Data

US 2025/0272177 A1     Aug. 28, 2025

Related U.S. Application Data

(63) Continuation-in-part of application No. PCT/CN2023/101083, filed on Jun. 19, 2023.

(30) Foreign Application Priority Data

Oct. 31, 2022     (CN) ......................... 202211343420.0

(51) Int. Cl.
G06F 11/00 (2006.01)
G06F 11/07 (2006.01)
G06N 20/00 (2019.01)

(52) U.S. Cl.
CPC ........ G06F 11/079 (2013.01); G06F 11/0751 (2013.01); G06N 20/00 (2019.01)

(58) Field of Classification Search
CPC .............. G06F 11/079; G06F 11/0793; G06F 11/0751; G06N 20/00
See application file for complete search history.

(56) References Cited

U.S. PATENT DOCUMENTS

| | | | | |
|---|---|---|---|---|
| 10,248,533 B1* | 4/2019 | Shah | ................... | G06F 11/3006 |
| 2014/0006330 A1* | 1/2014 | Biem | ................... | G06F 21/552 |
| | | | | 706/46 |

(Continued)

FOREIGN PATENT DOCUMENTS

| | | |
|---|---|---|
| CA | 2990910 A1 | 7/2018 |
| CN | 110851338 A | 2/2020 |

(Continued)

OTHER PUBLICATIONS

Li, Siyi et al., Overview of Root Cause Localization Method in Microservice Architecture, Frontiers of Data & Computing, 4(3): 78-89, 2022.

(Continued)

*Primary Examiner* — Jonathan D Gibson
(74) *Attorney, Agent, or Firm* — PORUS IP LLC

(57) ABSTRACT

The present disclosure discloses a method, a device, and an electronic device for locating an anomaly root cause. The method for locating the anomaly root cause includes obtaining an anomaly indicator of a target system, obtaining a data item set based on the anomaly indicator, determining an anomaly data item based on data fluctuation information of (Continued)

each data item of the data item set, obtaining an anomaly field corresponding to the anomaly data item based on the anomaly data item, and locating an anomaly root cause of the target system based on the anomaly field.

13 Claims, 4 Drawing Sheets

(56)                    References Cited

U.S. PATENT DOCUMENTS

| | | | | |
|---|---|---|---|---|
| 2016/0217022 | A1* | 7/2016 | Velipasaoglu | G06F 11/32 |
| 2017/0373925 | A1* | 12/2017 | Abrams | G06F 11/079 |
| 2019/0036795 | A1* | 1/2019 | Ouyang | G06N 20/00 |
| 2019/0179726 | A1* | 6/2019 | Hou | H04L 43/0876 |
| 2019/0356553 | A1* | 11/2019 | Mermoud | G06F 18/24323 |
| 2020/0174902 | A1* | 6/2020 | Buda | G06F 11/079 |
| 2020/0183946 | A1* | 6/2020 | Pelloin | G06F 17/18 |
| 2021/0136098 | A1* | 5/2021 | Stergioudis | G06N 20/10 |
| 2021/0216386 | A1 | 7/2021 | Masuzaki et al. | |
| 2022/0038332 | A1* | 2/2022 | Umakanth | H04L 41/5016 |
| 2022/0150103 | A1* | 5/2022 | Umakanth | H04L 41/0631 |
| 2022/0159021 | A1* | 5/2022 | Kwon | H04L 63/1425 |
| 2023/0048212 | A1* | 2/2023 | Wang | G06F 16/9024 |
| 2024/0289204 | A1* | 8/2024 | Prado | G06F 11/079 |
| 2024/0370328 | A1* | 11/2024 | Balla | G06F 11/3409 |
| 2025/0132970 | A1* | 4/2025 | Zhou | H04L 41/0631 |

FOREIGN PATENT DOCUMENTS

| | | | |
|---|---|---|---|
| CN | 111597070 | A | 8/2020 |
| CN | 111880959 | A | 11/2020 |
| CN | 111984503 | A | 11/2020 |
| CN | 113037575 | A | 6/2021 |
| CN | 113568950 | A | 10/2021 |
| CN | 113723555 | A | 11/2021 |
| CN | 113835947 | A | 12/2021 |
| CN | 114048055 | A | 2/2022 |
| CN | 114048365 | A | 2/2022 |
| CN | 114116397 | A | 3/2022 |
| CN | 114528175 | A | 5/2022 |
| CN | 115018106 | A | 9/2022 |
| CN | 115204436 | A | 10/2022 |
| CN | 115392812 | A | 11/2022 |
| JP | 2021018813 | A | 2/2021 |

OTHER PUBLICATIONS

First Office Action in Chinese Application No. 202211343420.0 mailed on Dec. 13, 2022, 15 pages.

Notification to Grant Patent Right for Invention in Chinese Application No. 202211343420.0 mailed on Jan. 11, 2023, 5 pages.

International Search Report in PCT/CN2023/101083 mailed on Jul. 24, 2023, 6 pages.

Written Opinion in PCT/CN2023/101083 mailed on Jul. 24, 2023, 9 pages.

* cited by examiner

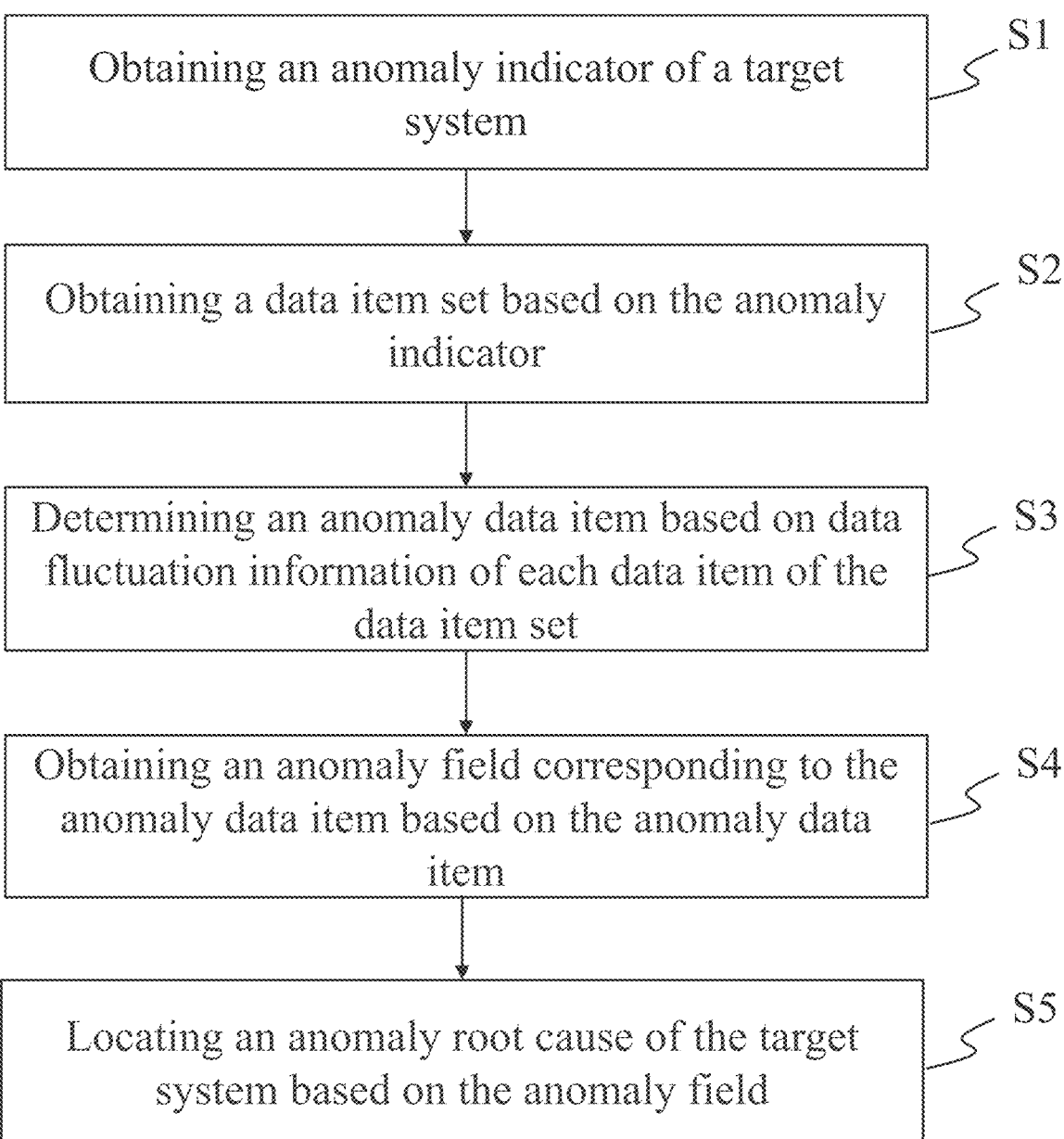

100

Obtaining an anomaly indicator of a target system — S1

Obtaining a data item set based on the anomaly indicator — S2

Determining an anomaly data item based on data fluctuation information of each data item of the data item set — S3

Obtaining an anomaly field corresponding to the anomaly data item based on the anomaly data item — S4

Locating an anomaly root cause of the target system based on the anomaly field — S5

FIG. 1

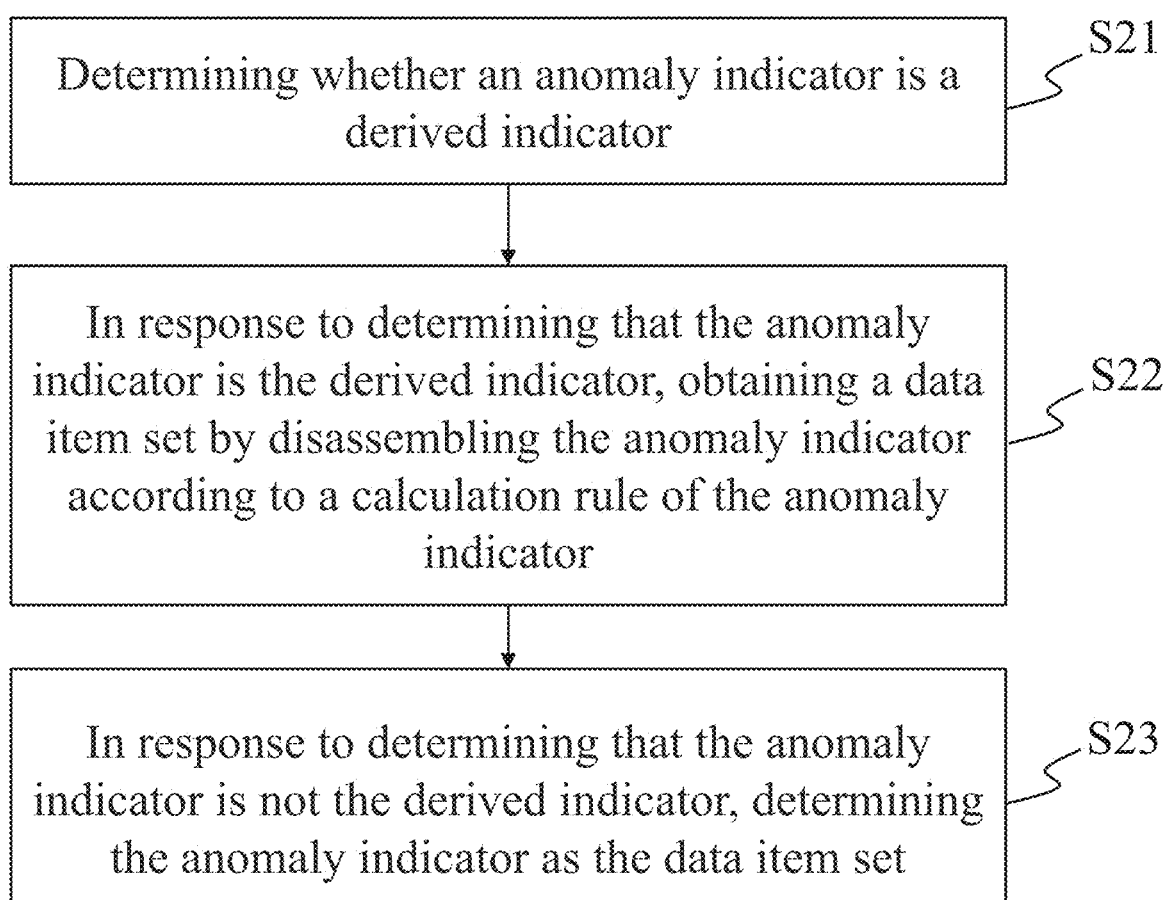

200

Determining whether an anomaly indicator is a derived indicator — S21

In response to determining that the anomaly indicator is the derived indicator, obtaining a data item set by disassembling the anomaly indicator according to a calculation rule of the anomaly indicator — S22

In response to determining that the anomaly indicator is not the derived indicator, determining the anomaly indicator as the data item set — S23

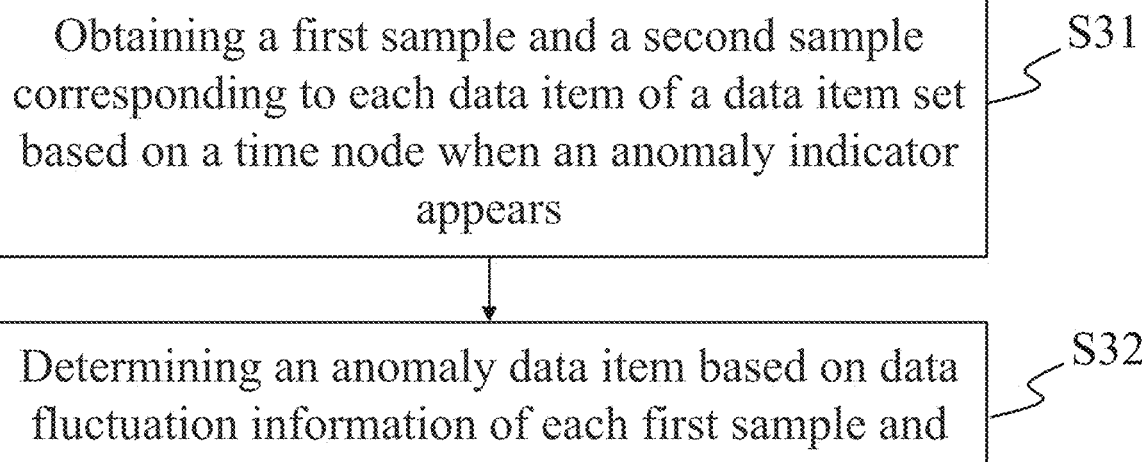

S31

Obtaining a first sample and a second sample corresponding to each data item of a data item set based on a time node when an anomaly indicator appears

S32

Determining an anomaly data item based on data fluctuation information of each first sample and each second sample

FIG. 3

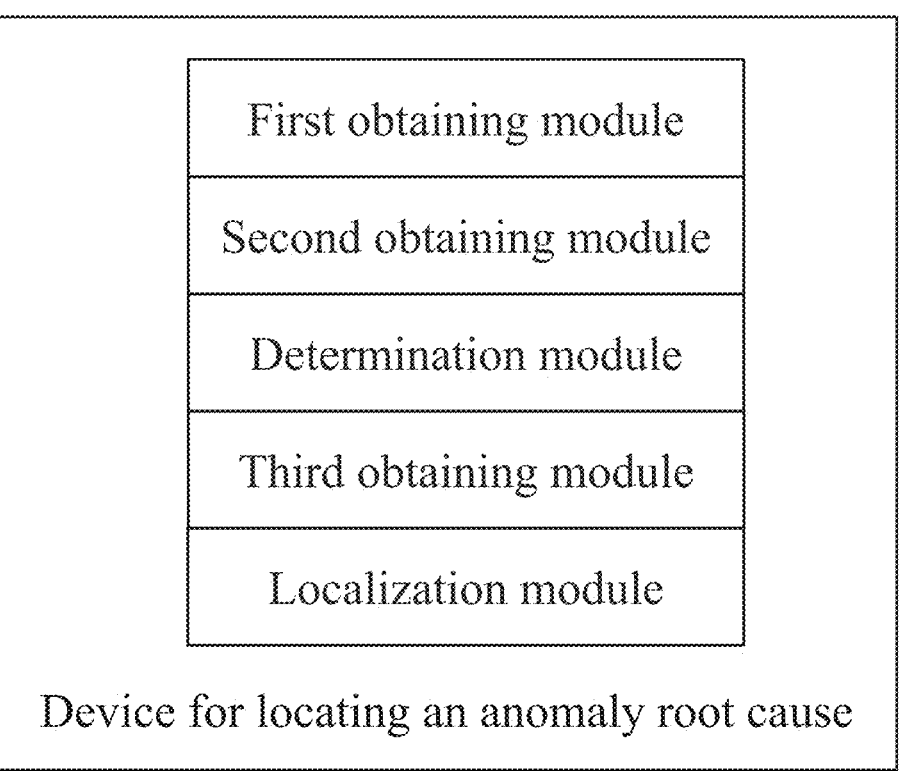

First obtaining module

Second obtaining module

Determination module

Third obtaining module

Localization module

Device for locating an anomaly root cause

FIG. 4

METHODS, DEVICES, AND ELECTRONIC DEVICES FOR LOCATING ANOMALY ROOT CAUSES

CROSS-REFERENCE TO RELATED APPLICATIONS

This application is a continuation-in-part of International Application No. PCT/CN2023/101083, filed on Jun. 19, 2023, which claims priority to Chinese Patent Application No. 202211343420.0, filed on Oct. 31, 2022, the entire contents of each of which are hereby incorporated by reference.

TECHNICAL FIELD

The present disclosure relates to the field of intelligent operation and maintenance technology, and in particular, to methods, devices, and electronic devices for locating anomaly root causes.

BACKGROUND

As the value of data, becomes increasingly evident, the application of the data in various industries is constantly deepening. By visualizing the data, the statuses and trends of business operations are reflected. A critical focus in data utilization involves identifying current business problems through changes in indicator data. A normal interval for an indicator may be set by combining business experience and historical data. An indicator value is monitored and judged to reflect whether the indicator is anomalous, or an anomaly point is identified by a statistical algorithm, a machine learning algorithm, etc., and anomaly data is marked on the indicator by color, etc., to prompt the user to find an anomaly indicator as soon as possible. However, existing method for locating the anomaly indicator is unable to accurately locate a root cause of the anomaly indicator, and requires manual participation, which is time-consuming and laborious.

SUMMARY

The main purpose of the present disclosure is to provide a method for locating an anomaly root cause, to solve the technical problem that the current method for locating an anomaly indicator may not accurately locate a root cause of the anomaly indicator.

The present disclosure provide a method for locating an anomaly root cause. The method may include obtaining the anomaly indicator of a target system; obtaining a data item set based on the anomaly indicator; obtaining a first sample and a second sample corresponding to each data item of the data item set based on a time node when the anomaly indicator appears, the first sample being a set of data items corresponding to the data item within a preset time period before the time node, and the second sample being a set of data items corresponding to the data item at the time node and within a preset time period after the time node; determining an anomaly data item based on data fluctuation information of each first sample and each second sample, including determining an average value of data items of the first sample, obtaining a first sample dispersion and a second sample dispersion by determining a dispersion of the first sample and a dispersion of the second sample relative to the average value of the data items, in response to determining that the first sample dispersion is greater than or equal to the second sample dispersion, the data item being a non-anomaly data item, and in response to determining that the first sample dispersion is smaller than the second sample dispersion, determining whether the data item is an anomaly data item based on a maximum dispersion of the first sample and a mean deviation of data items of the second sample; obtaining an anomaly field corresponding to the anomaly data item based on the anomaly data item; and locating an anomaly root cause of the target system based on the anomaly field.

The present disclosure also provides a device for locating an anomaly root cause. The device may include a first obtaining module configured to obtain the anomaly indicator of the target system; a second obtaining module configured to obtain the data item set based on the anomaly indicator; a determination module configured to determine the anomaly data item based on the data fluctuation information of the each data item of the data item set; a third obtaining module configured to obtain the anomaly field corresponding to the anomaly data item based on the anomaly data item; and a localization module configured to locate the anomaly root cause of the target system based on the anomaly field.

The present disclosure further provides an electronic device including at least one processor, at least one memory, and computer program instructions stored in the at least one memory that, when the computer program instructions are executed by the at least one processor, direct the at least one processor to perform the method for locating the anomaly root cause.

In summary, the beneficial effects of the present disclosure are as follows.

The method for locating the anomaly root cause in the present disclosure solves the technical problem that the current method for locating the anomaly indicator may not accurately locate the root cause of the anomaly indicator by obtaining the anomaly indicator of the target system, obtaining the data item set based on the anomaly indicator, determining the anomaly data item based on the data fluctuation information of the each data item of the data item set, obtaining the anomaly field corresponding to the anomaly data item based on the anomaly data item, and locating the anomaly root cause of the target system based on the anomaly field. The method for locating the anomaly root cause of the present disclosure locates the anomaly data item based on the data fluctuation information of the each data item of the data item set obtained from the anomaly indicator, accurately determines the anomaly data item in the data item set through the data fluctuation information, eliminates data items unrelated to the root cause which cause anomaly, narrows a range of the anomaly root cause, and locates the anomaly field based on the anomaly data item, which can facilitate a user to analyze causes for generating the anomaly root cause and take measures in time, so as to improve the operational efficiency of the enterprise. Finally, the method for locating the anomaly root cause locates the anomaly root cause based on the anomaly field, and traces back the anomaly root cause based on the anomaly indicator, which further narrows the range of the anomaly root cause and improves the accuracy of the anomaly root cause.

BRIEF DESCRIPTION OF THE DRAWINGS

FIG. 1 is a flowchart illustrating an exemplary method for locating an anomaly root cause according to some embodiments of the present disclosure;

FIG. 2 is a flowchart illustrating an exemplary process for obtaining a data item set according to some embodiments of the present disclosure;

FIG. 3 is a flowchart illustrating an exemplary process for determining an anomaly data item based on data fluctuation information according to some embodiments of the present disclosure;

FIG. 4 is a schematic diagram illustrating a device for locating an anomaly root cause according to some embodiments of the present disclosure.

DETAILED DESCRIPTION

Figure 5:
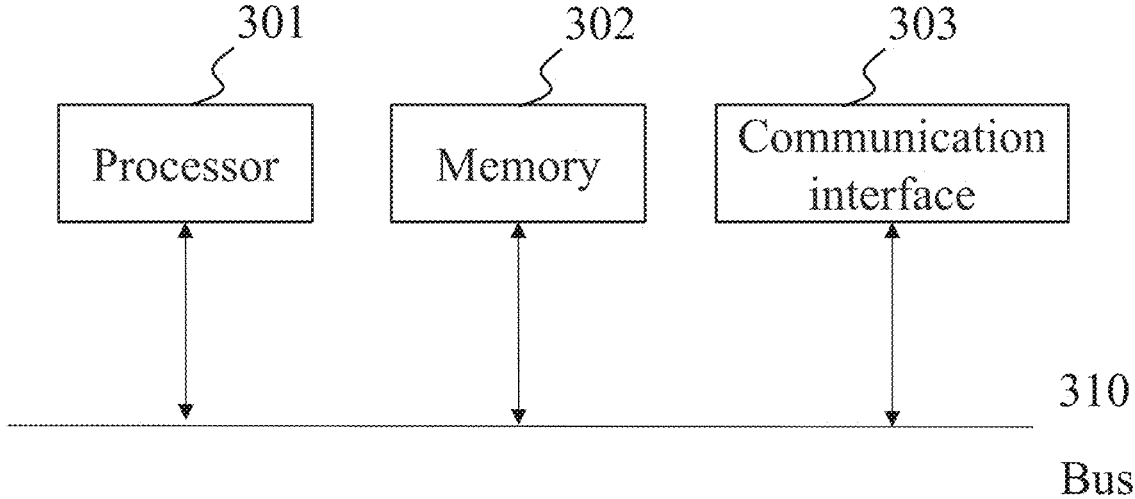
FIG. 5 is a schematic diagram illustrating an electronic device according to some embodiments of the present disclosure.

It should be understood that the specific embodiments described herein are intended only for the purpose of interpreting the present disclosure and are not intended to limit it.

In the prior technology, a common method for locating an anomaly root cause includes setting a normal interval for an indicator and monitoring an indicator value to reflect whether the indicator is anomalous, identifying an anomaly point by a statistical algorithm, a machine learning algorithm, etc., and marking an anomaly indicator by color, etc., to prompt a user to find the anomaly indicator as soon as possible and locating the anomaly root cause through the relevant business personnel to analyze and discuss the anomaly indicator, or locating the anomaly root cause through a data item corresponding to the anomaly indicator. While the common method solves the problem of locating the anomaly root cause to a certain extent, it suffers from the following problems. One data item may correspond to a plurality of fields in a database, including a dimension field and a calculated field. The dimension field is not involved in the calculation of the indicator, and the calculated field may be a single field or a multiple field. If the anomaly root cause is located only by the data item corresponding to the anomaly indicator, a range of the anomaly root cause may become larger, which reduces the locating accuracy of the anomaly root cause.

FIG. 1 is a flowchart illustrating an exemplary method for locating an anomaly root cause according to some embodiments of the present disclosure.

As shown in FIG. 1, in order to solve the above technical problems, the present disclosure provides a method for locating the anomaly root cause, which may be executed by a processor (e.g., a processor 301) of an electronic device. In some embodiments, process 100 includes the following operations.

In S1, an anomaly indicator of a target system is obtained

The target system refers to a system that requires anomaly analysis and/or processing (e.g., locating the anomaly root cause), which may be a variety of computer systems or business systems. For example, the target system may be a banking system, a power system, or the like. In some embodiments, the processor may obtain the anomaly indicator of the target system. The anomaly indicator refers to a data anomaly point whose value exceeds a preset threshold. In the embodiment, the processor sets a threshold corresponding to each indicator in the target system, when the indicator exceeds the corresponding threshold, the target system issues a warning message, and the processor locates the anomaly indicator based on the warning message to obtain the anomaly indicator.

In S2, a data item set is obtained based on the anomaly indicator

In some embodiments, in the target system, one indicator may correspond to one or more data items, and the processor may obtain the data item set based on the corresponding anomaly indicator. The data items refer to various types of parameter items preset in the target system based on business requirements. For example, when the data item is a central processing unit (CPU) temperature, the anomaly indicator may be that the CPU temperature exceeds a preset temperature threshold (e.g., at a certain time node t, the CPU temperature exceeds 70° C.), and the data item set corresponding to the anomaly indicator may be {CPU temperature}. The temperature value of the CPU temperature corresponding to a plurality of points in time before the time node t is a set of data items corresponding to the data item.

FIG. 2 is a flowchart illustrating an exemplary process for obtaining a data item set according to some embodiments of the present disclosure.

In some embodiments, operation S2 may be realized based on process 200, which may be executed by a processor. As shown in FIG. 2, the process 200 includes the following operations.

In S21, whether an anomaly indicator is a derived indicator is determined.

Specifically, the derived indicator refers to an indicator after a combination operation is performed on a data item, i.e., one derived indicator corresponds to two or more data items. The processor may first determine whether the anomaly indicator is the derived indicator. In response to determining that the anomaly indicator is the derived indicator, the processor may disassemble the anomaly indicator to obtain a data item set corresponding to the anomaly indicator, avoiding the problem of wrongly locating the anomaly root cause due to missing the data item. In response to determining that the anomaly indicator is not the derived indicator, the processor may omit the operation of disassembling the anomaly indicator, thus improving the efficiency of locating the anomaly root cause.

In S22, in response to determining that the anomaly indicator is the derived indicator, the data item set is obtained by disassembling the anomaly indicator according to a calculation rule of the anomaly indicator The anomaly indicator being the derived indicator means that the anomaly indicator is formed by performing combination operation on the two or more data items, and the processor disassemble the anomaly indicator according to the calculation rule of the anomaly indicator to obtain the data item set. For example, according to a combination operation rule, an indicator is calculated from a data item $d_1$ and a data item $d_2$, and if the indicator is the anomaly indicator, the data item set corresponding to the anomaly indicator is $\{d_1, d_2\}$. For example, for an anomaly indicator that an order transaction failure rate is higher than an expected threshold for a certain cycle, the order transaction failure rate is calculated from a count of orders and failed transactions and a total count of orders, then the corresponding data item set may be {orders with failed transactions, the count of orders}. Here is intended as an example only, and the actual operation rules may be determined by the business rules of the target system.

The anomaly indicator may be caused by one or more data items in the data item set. By disassembling the anomaly indicator to get the data item set, it is possible to obtain all data items related to the anomaly indicator, avoiding the problem of wrongly locating the anomaly root cause due to missing the data item and improving the accuracy of localization.

In S23, in response to determining that the anomaly indicator is not the derived indicator, the anomaly indicator is determined as the data item set.

In response to determining that the anomaly indicator is not the derived indicator, i.e., the anomaly indicator is an atomic indicator, then the processor does not need to disassemble the anomaly indicator and designates the anomaly indicator as the data item set. Therefore, the obtained data item set includes only one data item. The above process of omitting the operation of disassembling the anomaly indicator improves the efficiency of locating the anomaly root cause.

In S3, an anomaly data item is determined based on data fluctuation information of each data item of the data item set.

Since there may be only one or more anomaly data items in the data item set, the one or more anomaly data items are determined based on the data fluctuation information of each data item of the data item se. Data items unrelated to the root cause which cause the anomaly are eliminated, which further narrows the range of the anomaly root cause and improves the accuracy of locating the anomaly root cause.

In some embodiments, the data fluctuation information may be determined by a Pearson correlation coefficient. The processor selects a preset count of data items before or after a time node when the anomaly indicator appears as a data sample, substitutes each data item and the anomaly indicator in the data sample into a Pearson correlation coefficient calculation formula to obtain a correlation value between each data item and the anomaly indicator in the data sample. Then, the processor ranks the data items according to correlation values, and a data item with a largest correlation value is the anomaly data item, where the Pearson correlation coefficient is prior art and will not be repeated herein.

FIG. 3 is a flowchart illustrating an exemplary process for determining an anomaly data item based on data fluctuation information according to some embodiments of the present disclosure.

As some optional embodiments of the present disclosure, operation S3 may be realized based on process 300, which may be executed by a processor. As shown in FIG. 3, the process 300 includes the following operations.

In S31, a first sample and a second sample corresponding to each data item of a data item set are obtained based on a time node when an anomaly indicator appears, where the first sample is a set of data items corresponding to the data item within a preset time period before the time node, and the second sample is a set of data items corresponding to the data item at the time node and within a preset time period after the time node.

In this embodiment, the processor first obtains the time node when the anomaly indicator appears, and the time node is obtained by a warning message of the anomaly indicator. After obtaining the time node, for each data item of the data item set, the processor obtains the corresponding first sample and the corresponding second sample. The first sample is the set of data items corresponding to the data item within the preset time period before the time node, and the second sample is the set of data items corresponding to the data item at the time node and within the preset time period after the time node.

The preset time period is determined based on the target system. Merely by way of example and not as a limitation, the preset time period may be 10 minutes, one hour, one day, one week, etc. The processor denotes the first sample as $T_n$ $\{x_1, x_2, \ldots, x_n\}$, and notates the second sample as $S_n$ $\{y_1, y_2, \ldots, y_n\}$, where $y_1$ denotes the data item corresponding to the time node when the anomaly indicator appears, and n denotes a count of data items.

The preset time period is determined based on the target system. When the target system is a power system, a banking system, or other systems with large data acquisition volumes, the preset time period may be set in a unit of minutes, to avoid the problem that the efficiency in locating the anomaly root cause is decreased due to an excessively large sample volume. When the target system is a system with a smaller data acquisition volume, the preset time period may be set in a unit of hour or other larger time units, to avoid the problem that the data fluctuation information is inaccurate due to an excessively small sample volume, which causes the problem in wrongly locating the anomaly root cause.

In some embodiments, the processor determines the preset time period based on a data item characteristic of each data item and a system characteristic of the target system.

The data item characteristic of each data item includes at least one of a data acquisition volume, a data updating frequency, or an updating heat cycle of each data item. The system characteristic of the target system includes at least one of a data acquisition volume, a system load, or a network load of the target system.

The data item characteristic may be obtained through data monitoring and statistics (e.g., database statistics) on each data item. The data acquisition volume of each data item characterizes the average data volume (e.g., data flow) of the data item in a preset unit of time (e.g., 1 minute). The data updating frequency characterizes the frequency of updating (e.g., reading and/or writing) data in the preset unit of time. The updating heat cycle includes an updating heat (e.g., an updating frequency) in different time periods within a cycle, and the cycle may be a day, a month, etc., which may be determined based on the historical data corresponding to the data item.

The system characteristic of the target system is used to reflect an operational status of the target system, which may be obtained by monitoring various operational parameters of the target system. For example, the data acquisition volume may be obtained by monitoring a data throughput volume, the system load may be obtained by monitoring resource utilization (e.g., a memory occupation, a CPU usage, a disk capacity, etc.) of the target system, and the network load may be obtained by monitoring network (e.g., a network request volume).

The data item characteristic and the system characteristic may comprehensively reflect a state of each data item and/or the target system when the anomaly indicator appears, which may be stored in forms of a log, a data table, etc., and used for subsequent analysis and processing (e.g., tracking, locating, processing, etc., an anomaly or the anomaly root cause). In some embodiments, the processor may perform a time period matching process in an anomaly localization data table based on the data item characteristic and the system characteristic to determine the preset time period.

The anomaly localization data table includes a plurality of anomaly localization records in a historical time period (e.g., the past year, the past half year, etc.). An anomaly localization record may include a historical anomaly time point when a historical anomaly indicator appeared, a historical data item characteristic of each data item, and a historical system characteristic of the target system. The anomaly localization record also includes a historical preset time period when locating and processing a historical anomaly root cause, a historical anomaly localization result (e.g., the anomaly root cause), and a failure rate after a historical anomaly localization.

The failure rate after the historical anomaly localization is used to reflect the appearance frequency of anomalies in the target system after a historical anomaly has been repaired, e.g., the appearance count of the anomalies within a preset monitoring cycle (e.g., a day, a week). The more accurate the anomaly localization result, the higher the efficiency and accuracy of repairing an anomaly, and the lower the subsequent failure rate.

The processor may match the target anomaly localization record in the anomaly localization data table by the time period matching process. The target anomaly localization record may be an anomaly localization record that has a similarity of less than a threshold to a current data item characteristic and system characteristic and has a lowest failure rate after the historical anomaly localization. The processor may designate the historical preset time period corresponding to the target anomaly localization record as the preset time period. The similarity may be determined based on a vector distance (e.g., a Euclidean distance, etc.), etc.

In some embodiments of the present disclosure, considering the complexity of anomaly tracking, the preset time period is determined by comprehensively considering the current data item characteristic and the system characteristic, to make locating and processing of the subsequent anomaly root cause more comprehensive and more in line with the actual situation, thus enhancing the accuracy of an anomaly root cause localization result.

In S32, the anomaly data item is determined based on data fluctuation information of each first sample and each second sample.

In some embodiments, the processor obtains the data fluctuation information of the first sample and the second sample separately. Since the second sample includes a data item corresponding to the anomaly indicator, if there is an anomaly data item in the second sample, the data fluctuation information of the second sample and the data fluctuation information of the first sample may differ. The processor compares the data fluctuation information of the first sample and the data fluctuation information of the second sample of each data item of the data item set, to determine the anomaly data item in the data item set. In contrast to prior art that determines the anomaly data item by an influence factor obtained only from the difference between a data item and a preset threshold, the present embodiment determines the anomaly data item based on the data fluctuation information of the first sample and the data fluctuation information of the second sample. The present embodiment avoids a situation in which the preset threshold is set incorrectly, and determines the anomaly data item more accurately, thereby improving the accuracy of the localization of the anomaly root cause. Furthermore, determining the anomaly data item in the data item set based on the data fluctuation information eliminates the data item that is not related to the root cause that causes anomaly, and narrows the range of the anomaly root cause.

As some optional embodiments of the present disclosure, the operation S32 includes the following operations.

In S321, an average value of data items of the first sample is determined.

In some embodiments, the average value of the data items of the first sample is determined according to the following formula (1):

$$u_1 = \frac{\sum_{i=1}^{n} x_i}{n}. \tag{1}$$

In the formula (1), $u_1$ denotes the average value of the data items of the first sample, n denotes the count of the data items of the first sample, and $x_i$ denotes an $i^{th}$ data item in the first sample, where i and n are positive integers and $1 \leq i \leq n$.

In S322, a first sample dispersion and a second sample dispersion are obtained by determining a dispersion of the first sample and a dispersion of the second sample relative to the average value of the data items.

In some embodiments, after obtaining the average value of the data items of the first sample, the processor determines the dispersion of the first sample according to the following formula (2):

$$\sigma_1 = \sqrt{\frac{\sum_{i=1}^{n} (x_i - u_1)^2}{n - 1}}. \tag{2}$$

The processor determines the dispersion of the second sample according to the following formula (3):

$$\sigma_2 = \sqrt{\frac{\sum_{i=1}^{n} (y_i - u_1)^2}{n - 1}}. \tag{3}$$

In the formula (2) and the formula (3), 01 denotes the dispersion of the first sample, $\sigma_2$ denotes the dispersion of the second sample, $u_1$ denotes the average value of the data items of the first sample, $x_i$ denotes the $i^{th}$ data item of the first sample, $y_i$ denotes an $i^{th}$ data item of the second sample, and $u_2$ denotes the average value of the data items of the second sample, which may be obtained based on a similar manner as formula (1).

In S323, in response to determining that the first sample dispersion is greater than or equal to the second sample dispersion, the data item is a non-anomaly data item.

A maximum dispersion of the first sample refers to a maximum deviation of the value of a single data item in the first sample from the overall data average of the first sample. In other words, the maximum dispersion measures the maximum deviation from the value of a single data item in a data set (e.g., values of the data items in the first sample). A difference between the maximum dispersion and the first sample dispersion is that the first sample dispersion measures the overall deviation of the data set (i.e., the set of data items corresponding to the first sample). Since the data items of the first sample exclude the data item corresponding to the time node when the anomaly indicator appears, and the second sample includes the data item corresponding to the time node when the anomaly indicator appears, the first sample dispersion may be used as an evaluation criterion for evaluating the second sample dispersion. In response to determining that the first sample dispersion is greater than or equal to the second sample dispersion, there is no anomaly data item in the second sample.

In S324, in response to determining that the first sample dispersion is smaller than the second sample dispersion, whether the data item is the anomaly data item is determined based on the maximum dispersion of the first sample and a mean deviation of data items of the second sample.

In response to determining that the first sample dispersion is smaller than the second sample dispersion, there is an anomaly data item in the second sample, or there may be a case where a dispersion of each data item in the second sample is relatively large but not so large as to be anomaly. Therefore, the processor is necessary to further judge the data items in the second sample based on the maximum dispersion of the first sample and the mean deviation of the data items of the second sample, so as to avoid judging the case where the dispersion of each data item in the second sample is relatively large as a case where the second sample includes the anomaly data item, which improves the accuracy of locating the anomaly data item and improve the accuracy of locating the anomaly root cause.

As some optional embodiments of the present disclosure, the operation S324 includes the following operations:

In S3241, in response to determining that the maximum dispersion is greater than or equal to the mean deviation of the data items, the data item is the non-anomaly data item.

In some embodiments, the processor first determines a dispersion of each data item in the first sample, and the dispersion is a difference between a value of each data item and the average value of the data item. After obtaining the dispersion of each data item in the first sample, the processor obtains a dispersion with a largest value from a plurality of dispersions, records the dispersion as a maximum dispersion, and determines the mean deviation of the second sample subsequently according to following formula (4):

$$MD = \frac{\sum_{i=1}^{n} |y_i - \overline{y}|}{n}. \tag{4}$$

In the formula (4), MD denotes the mean deviation of the data items, $y_i$ denotes the $i^{th}$ data item in the second sample, n denotes the count of the data items in the second sample, and $y_i$ denotes the $i^{th}$ data item in the second sample, where i and n are positive integers and $1 \le i \le n$.

Compare the maximum dispersion of the first sample with the mean deviation of the data items of the second sample, since each data item in the first sample is the non-anomaly data item, if the mean deviation of the data items of the second sample is less than or equal to the maximum dispersion of the first sample, the data item in the second sample is determined to be the non-anomaly data item.

In S3242, in response to determining that the maximum dispersion is less than the mean deviation of the data items, the data item is the anomaly data item In response to determining that the mean deviation of the data items of the second sample is greater than the maximum dispersion of the first sample, there is the anomaly data item in the second sample. The processor further judges the data items in second sample based on the maximum dispersion of the first sample and the mean deviation of the data items of the second sample, to avoid judging the case where the dispersion of each data item of the second sample is relatively large as the case where the second sample includes the anomaly data item, which improves the accuracy of locating the anomaly data item, and improves the accuracy of locating the anomaly root cause.

In some embodiments, the operation of determining an anomaly data item based on data fluctuation information of each first sample and each second sample includes for each data item in the data item set, the processor determines a first anomaly degree of the data item based on the data fluctuation information, determines a predictive set of data items corresponding to the data item within the preset time period after the time node by processing the first sample based on a fluctuation prediction model, the fluctuation prediction model being a trained machine learning model, determines a second anomaly degree of the data item based on the predictive set of data items and the second sample, determines a comprehensive anomaly degree based on the first anomaly degree and the second anomaly degree, and determines the anomaly data item based on the comprehensive anomaly degree of a plurality of data items of the data item set.

For ease of description, each data item in the data item set is also referred to as a candidate data item.

The first anomaly degree of the candidate data item characterizes the degree of the candidate data item influencing the anomaly indicator. The greater the correlation between the candidate data item and the anomaly indicator, the greater the first anomaly degree. The first anomaly degree may be determined based on the data fluctuation information obtained in the operation S3, i.e., the first anomaly degree may be determined based on the Pearson correlation coefficient corresponding to each candidate data item.

In some embodiments, the fluctuation prediction model is a long short-term memory (LSTM) model. An input of the fluctuation prediction model includes the first sample, and an output of the fluctuation prediction model includes the predictive set of data items.

The predictive set of data items refers to a set of data items corresponding to each candidate data item within the preset time period after the time node, assuming that no anomaly indicator appears. In other words, the predictive set of data items reflects a normal change in the set of data items corresponding to each candidate data item before and after a certain time point (e.g., a time point when the anomaly indicator appears as a base time point). A trained fluctuation prediction model is configured to predict a change trend (e.g., a change direction and/or a change magnitude in a data value) of the set of data items corresponding to each candidate data item before and after the base time point.

In some embodiments, the processor may iteratively train an initial model (e.g., an initial LSTM model) to obtain the trained fluctuation prediction model. Each training sample may include a first training sample before any sample time point and within a sample preset time period (hereinafter referred to as a first sample time period) in a historical time period (e.g., past one month, half a year, etc.) and a second training sample after the any sample time and within a sample preset time period (hereinafter referred to as a second sample time period). A sample time point is a time point when no anomaly indicator appears, the first training sample and the second training sample include the same sample data items (e.g., n sample data items), and the n sample data items constitute a sample data item set.

Each first training sample includes a set of sample data items (hereinafter referred to as a first sample data set) for each sample data item during the first sample time period, and each second training sample includes a set of sample data items (hereinafter referred to as a second sample data set) for each sample data item during the second sample time period.

The second sample data set may serve as a training label, which may be manually labeled or otherwise labeled. Exemplarily, a first training sample may be notated as $T_i$ {[$x_{11}$, $x_{12}, \ldots, x_{1m}], [x_{21}, x_{22}, \ldots, x_{2m}], \ldots, [x_{n1}, x_{n2}, \ldots, x_{nm}]\}$. The first training sample includes n sample data items, $[x_{n1}, x_{n2}, \ldots, x_{nm}]$ denotes a first sample data set corresponding to a nth sample data item, which contains data values corresponding to m data items, and m may be preset for unifying a dimension of the set of sample data items corresponding to each sample data item.

When training, the processor may determine the value of a loss function based on a difference between the output of the initial model and the training label. A parameter of the initial model may be iteratively updated based on the value of the loss function until a training termination condition is met (e.g., the loss function converges, a specific count of iterations is performed, etc.). An updated initial model may be used as the trained fluctuation prediction model. Training the initial model with a plurality of first training samples and a plurality of second training samples corresponding to the plurality of first training samples enables the initial model to learn a data correlation (e.g., a fluctuation pattern) between the first sample data set and the second sample data set of the target system at different sample times.

Considering that in real-world application scenarios, data items associated with different anomaly indicators and a count of the associated data items may vary. The fluctuation prediction model may include a plurality of different specific models. Each specific model refers to a fluctuation prediction model for a particular anomaly indicator. For example, the fluctuation prediction model may include a specific model for an anomaly indicator $A_1$, a specific model for an anomaly indicator $A_2$, . . . , and a specific model for an anomaly indicator $A_n$. Merely by way of example, in practice, the specific model for the anomaly indicator $A_1$ may be used for processing the anomaly indicator $A_1$.

The training process of each specific model is similar to the training of the fluctuation prediction model described above. Merely by way of example, the processor may obtain a sample data item set corresponding to a sample anomaly indicator $A_1$ from historical data based on a similar manner as the operation S2, and then generate a third training sample and a corresponding fourth training sample like the construction of the first training sample and the second training sample for training the initial model to obtain a trained specific model for the anomaly indicator $A_1$.

In other embodiments, the specific model may be obtained by training based on a migration learning algorithm. For example, a trained specific model for the anomaly indicator $A_1$ may be used as an initial model to be used for training to obtain the specific model for the anomaly indicator $A_2$. At this point, the processor uses a training sample corresponding to the anomaly indicator $A_2$ to train the specific model for the anomaly indicator $A_2$.

In some embodiments of the present disclosure, utilizing a trained specific model can better adapt to the anomaly actually appearing in the target system, thereby making the result of subsequently determining the anomaly data item more accurate, and at the same time, reducing the difficulty in constructing the training sample and improving training efficiency.

The second anomaly degree reflects a degree of a difference between the predictive set of data items and a corresponding actual set of data items. The greater the second anomaly degree, the greater the deviation of a data value of the actual set of data items from a normal value (a predicted value), and thus the greater the probability of an anomaly data item in the actual set of data items. The actual set of data items refers to a set of actual data items corresponding to each candidate data item within the preset time period after the base time, which may be obtained in a manner similar to obtaining the second sample.

In some embodiments, the processor may determine the second anomaly degree corresponding to each candidate data item based on a difference between a first data value of each data item in the predictive set of data items and a second data value of each data item in the second sample. The second anomaly degree may be one of a maximum value or an average of the difference between the first data value and the second data value.

In some embodiments, the processor may determine the comprehensive anomaly degree by a weighted sum of the first anomaly degree and the second anomaly degree, which may be determined based on the following formula (5):

$$e = k1 * e1 + k2 * e2. \tag{5}$$

In the formula (5), e denotes the comprehensive anomaly degree, $e_1$ denotes the first anomaly degree, $e_2$ denotes the second anomaly degree, $k_1$ denotes a first weight corresponding to the first anomaly degree, and $k_2$ denotes a second weight corresponding to the second anomaly degree, where $k_1$ and $k_2$ are preset weight values, and a sum of the first weight and the second weight is 1. For example, $k_1$ is 0.6 and $k_2$ is 0.4.

In some implementations, after determining the comprehensive anomaly degree corresponding to each data item in the predictive set of data items, the processor may rank a plurality of comprehensive anomaly degrees (e.g., in descending rank) and use one or more data items corresponding to top-ranked one or more comprehensive anomaly degrees as the anomaly data item. For example, the processor uses a data item with the largest comprehensive anomaly degree as the anomaly data item.

In some embodiments, the processor determines a predictive fluctuation characteristic based on the first sample and the predictive set of data items, determines the second weight corresponding to the second anomaly degree and the first weight corresponding to the first anomaly degree based on the predictive fluctuation characteristic, and determines the comprehensive anomaly degree based on the first anomaly degree, the first weight, the second anomaly degree, and the second weight.

A fluctuation characteristic may include but is not limited to, a coefficient of variation, an extreme deviation, a variance, etc. The predictive fluctuation characteristic is used to reflect a fluctuation of data (e.g., a data value corresponding to each data item) in the first sample and the predictive set of data items before and after a current anomaly time node within a preset time period. If a similarity between a fluctuation characteristic of historical data and the predictive fluctuation characteristic in a historical cycle is greater than a preset threshold, the second weight may be set higher, and correspondingly, the first weight may be adjusted down.

The historical data may be a set of data items corresponding to the data item within the preset time period before and after a certain historical time point (a time point when no anomaly indicator appears). The higher the similarity, the predictive fluctuation characteristic is more in line with a change in the target system during normal operation, the more the difference between the predictive set of data items and the second sample (i.e., the second anomaly degree) reflects the deviation of actual data after the anomaly indicator appears, thus making the determined comprehensive anomaly degree more accurate.

In some embodiments, the determination of the first anomaly degree is optional. The processor may process the first sample directly based on the fluctuation prediction model, determine the predictive set of data items corresponding to the data item within the preset time period after the time node, determine the second anomaly degree of the data item based on the predictive set of data items and the second sample, and determine the anomaly data item based on the second anomaly degree. For example, the processor uses a data item with the largest second anomaly degree as the anomaly data item.

In S4, an anomaly field corresponding to the anomaly data item is obtained based on the anomaly data item.

In some embodiments, after completing the localization of the anomaly data item, the processor may locate the anomaly field corresponding to the anomaly data item in the database based on the anomaly data item, which further narrows the range of the anomaly root cause. Compared with locating the anomaly root cause based on the data item, locating the anomaly field can facilitate subsequent analysis of the anomaly root cause by business personnel, improve the efficiency of the business personnel in taking corresponding measures to solve anomaly based on the anomaly root cause, and save manpower and material resources while improving the efficiency of enterprise operations.

As some optional embodiments of the present disclosure, the operation S4 includes the following operations.

In S41, an original field of the anomaly data item is obtained based on a data warehouse detail table corresponding to the anomaly data item.

The data warehouse detail table refers to a table in a data warehouse that stores the most original and granular data in a source system. For example, the data warehouse detail table may store original data related to business processing and a data structure (e.g., a type, a constraint rule) thereof in the target system. The data structure may include a field corresponding to the original data, i.e., the original field. In some embodiments, the processor may perform a reverse derivation based on an application layer of the modeling of the anomaly data item to obtain the data warehouse detail table corresponding to the anomaly data item and obtain a source database of the anomaly data item based on the data warehouse detail table, thereby obtaining the original field.

In S42, a dimension field and a calculated field is obtained by disassembling the original field based on a preset rule.

The original field includes the dimension field and the calculated field, and the dimension field does not participate in the calculation so as not to cause an anomaly of the data. Therefore, in this operation, the processor disassembles the original field based on the preset rule to obtain the dimension field and the calculated field, and only judges the calculated field in subsequent operations, which improves the efficiency of locating the anomaly root cause.

In the embodiment, the preset rule is a data cleaning processing rule, which is a prior art. Disassembling the original field into a dimension field and a calculated field not only improves the efficiency of locating the root cause but also further narrows the range of the anomaly root cause and improves the accuracy of locating the anomaly root cause.

In S43, in response to determining that the calculated field is a single field, the calculated field is determined as the anomaly field.

The single field refers to a field that is directly involved in the calculation and cannot be disassembled further. A multiple field refers to a plurality of fields associated with a single field. After obtaining the calculated field based on the original field, the processor is necessary to determine whether the calculated field is the single field or the multiple field. In response to determining that the calculated field is a single field, the calculated field is determined as the anomaly field.

In S44, in response to determining that the calculated field is the multiple field, a third sample and a fourth sample corresponding to each calculated field is obtained, where the third sample is a set of fields corresponding to the calculated field within a second preset time period before the time node when the anomaly indicator appears, and the fourth sample is a set of fields corresponding to the calculated field at the time node and within a second preset time period after the time node.

The third sample and the fourth sample are obtained in the same manner as the operation S32, which is not described herein.

In S45, an anomaly field of the calculated field is determined based on data fluctuation information of each third sample and each fourth sample.

After obtaining each third sample and each fourth sample, according to the same manner as the operation S33, the processor obtains the data fluctuation information of each third sample and each fourth sample and determines the anomaly field in the multiple field based on the data fluctuation information, thereby realizing accurate localization of the anomaly root cause by gradually narrowing down a range from the anomaly indicator, the anomaly data item to the anomaly field.

In S5, the anomaly root cause of the target system is located based on the anomaly field.

As some optional embodiments of the present disclosure, the operation S5 includes the following operations.

In S51, the anomaly root cause in the target system is located based on a mapping relationship between a database corresponding to the anomaly field and the target system.

In some embodiments, the processor may obtain the database and a data form storing the anomaly field based on the anomaly field, and track back a business module where the anomaly data originated based on the mapping relationship of the corresponding database and the data form with the business module in the target system, thereby realizing the localization of the anomaly root cause and facilitating the targeted resolution of business problem by the subsequent business personnel.

In some embodiments, after determining the anomaly root cause of the target system, the processor may determine an anomaly root cause type based on the anomaly root cause. The anomaly root cause type includes at least a data anomaly and a business anomaly.

In some embodiments, in response to determining that the anomaly root cause type is the data anomaly, the processor blocks a communication port accessed by a first preset user. The first preset user may be a base user. For example, the first preset user may be an end user (e.g., a deposit user of a banking system, etc.) who directly uses the target system to receive services. The processor may block the first preset user from accessing data by blocking the communication port accessed by the first preset user.

In some embodiments, in response to determining that the anomaly root cause type is the business anomaly, the processor only opens the communication port operated by a second preset user. The second preset user may be an administrator, an operator, and business personnel, etc., of the target system. Opening only the communication port operated by the second preset user facilitates the second preset user to specifically process a business problem when the business anomaly appears in the target system.

In some embodiments, in response to determining that the target system is a banking system and the anomaly root cause type is the data anomaly, the processor isolates a data storage node in the target system that has the anomaly root cause. The data storage node may be a database, a data table, or a storage device (e.g., a storage server and a disk) that stores the anomaly field. There are a plurality of data isolation manners for isolating the data storage node.

For example, the plurality of data isolation manners include database isolation, data table isolation, data row isolation in the data table, partition isolation to the storage device, or the like. As another example, the plurality of data isolation manners may include controlling access to a data node as read-only or inaccessible. Merely by way of example, when a data read request of the anomaly field in an address range of the storage device is detected, an address decoder works in conjunction with an access control module to trigger a block to prevent data reading or accessing.

In some embodiments of the present disclosure, isolation of anomaly data is achieved by isolating a data storage node in the target system in which an anomaly root cause exists, thereby avoiding further interaction, transmission, or diffusion of the anomaly data and improving the data reliability of the target system.

In some embodiments, in response to determining that the target system is the banking system and the anomaly root cause is the business anomaly, the processor isolates a business processing node in the target system that has the anomaly root cause.

The business processing node may be a business module (e.g., a deposit business module, a loan business module, a financial product business module, etc.) related to the anomaly root cause. There are a plurality of business isolation manners for isolating the business processing node. For example, the plurality of business isolation manners may include interception (e.g., controlling or blocking a business process), circuit breaker (e.g., cutting off a business call link, etc.), etc.

For example, when a reading and writing request of an anomaly business in an address range of the storage device is detected, the address decoder works in conjunction with the access control module to trigger the circuit breaker. As another example, an interceptor may intercept a business accessing request for an anomaly business at an application (business) level, to block further access to the anomaly business.

Merely by way of example, when the business module traced back to the source of the anomaly data is the deposit business module, the anomaly root cause type is a deposit business anomaly, at this time, the processor may cut off a further execution of the anomaly deposit business and/or stop further access to the anomaly deposit business by the plurality of business isolation manners such as the circuit breaker, the interception, etc.

In some embodiments of the present disclosure, a fault isolation of an anomaly business module may be realized by isolating the business processing node in the target system where the anomaly root cause exists, which avoids triggering a chain reaction of faults, thereby safeguarding the business high availability and the security of the target system.

In summary, the beneficial effects of the present disclosure are as follows.

The method for locating the anomaly root cause in the present disclosure solves the technical problem that the current method for locating the anomaly indicator may not accurately locate the root cause of the anomaly indicator by obtaining the anomaly indicator of the target system, obtaining the data item set based on the anomaly indicator, determining the anomaly data item based on the data fluctuation information of the each data item of the data item set, obtaining the anomaly field corresponding to the anomaly data item based on the anomaly data item, and locating the anomaly root cause of the target system based on the anomaly field. It can be seen that the method for locating the anomaly root cause of the present disclosure locates the anomaly data item based on the data fluctuation information of the each data item of the data item set obtained from the anomaly indicator, accurately determines the anomaly data item in the data item set through the data fluctuation information, eliminates data items unrelated to the root cause which cause anomaly, narrows a range of the anomaly root cause, and locates the anomaly field based on the anomaly data item, which can facilitate a user to analyze causes for generating the anomaly root cause and take measures in time, so as to improve the operational efficiency of the enterprise. Finally, the method for locating the anomaly root cause locates the anomaly root cause based on the anomaly field, and traces back the anomaly root cause based on the anomaly indicator, which further narrows the range of the anomaly root cause and improves the accuracy of the anomaly root cause.

FIG. 4 is a schematic diagram illustrating a device for locating an anomaly root cause according to some embodiments of the present disclosure.

In order to solve the above technical problem, the present disclosure also proposes a device for locating an anomaly root cause, as shown in FIG. 4, the device includes the following modules.

A first obtaining module, which is configured to obtain an anomaly indicator of a target system.

A second obtaining module, which is configured to obtain a data item set based on the anomaly indicator.

A determination module, which is configured to determine an anomaly data item based on data fluctuation information of each data item of the data item set.

A third obtaining module, which is configured to obtain an anomaly field corresponding to the anomaly data item based on the anomaly data item.

A localization module, which is configured to locate the anomaly root cause of the target system based on the anomaly field.

It is to be noted that modules in the device for locating the anomaly root cause of the present embodiment are one-to-one correspondence with the operations in the method for locating the anomaly root cause of the foregoing embodiment. Therefore, the specific implementations of the present embodiment and the technical effects achieved can be referred to in the foregoing preparation of the method of the embodiment and will not be repeated herein.

Alternatively, the method for locating the anomaly root cause described in conjunction with the embodiments of the present disclosure described in FIG. 1 may be realized by an electronic device. FIG. 5 is a schematic diagram illustrating an electronic device according to some embodiments of the present disclosure.

The electronic device may include at least one processor 301, at least one memory 302, and computer program instructions stored in the at least one memory 302 that, when the computer program instructions are executed by the at least one processor 301, direct the at least one processor 301 to perform the method of the embodiments described above.

In some embodiments of the present disclosure, the processor 301 may include a central processing unit (CPU), or an application specific integrated circuit (ASIC), or may be configured as one or more integrated circuits of the embodiments of the present disclosure.

The memory 302 may include a mass memory for storing data or instructions. By way of example and not limitation, the memory 302 may include two or more of a hard disk drive (HDD), a floppy disk drive, a flash memory, an optical disk, a magneto-optical disk, a magnetic tape, a universal serial bus (USB) drive, or any combination thereof. In an appropriate case, the memory 302 may include a removable or non-removable (or fixed) medium. Where appropriate, the memory 302 may be internal or external to a data processing device. In particular embodiments, the memory 302 is a non-volatile solid state memory. In particular embodiments, the memory 302 includes a read-only memory (ROM). In an appropriate case, the ROM may be two or more of a mask programmed ROM, a programmable ROM (PROM), an erasable PROM (EPROM), an electrically erasable PROM (EEPROM), an electrically rewritable ROM (EAROM), a flash memory, or any combination thereof.

The processor 301 implements any of the methods for locating the anomaly root causes of the above embodiments by reading and executing the computer program instructions stored in the memory 302.

In some embodiments, the electronic device for locating the anomaly root cause may also include a communication interface and a bus. As shown in FIG. 5, the processor 301, the memory 302, and a communication interface 303 are connected and communicate with each other via a bus 310. The communication interface is mainly configured to realize the communication among the modules, devices, units, and/or equipment in the embodiments of the present disclosure.

The bus includes hardware, software, or both, and components of the electronic device are coupled to each other. By way of example and not limitation, the bus may include two or more of an accelerated graphics port (AGP) or other graphics buses, an enhanced industry standard architecture (EISA) bus, a front side buses (FSB) bus, hyper transport (HT) interconnection, an industry standard architecture (ISA) bus, unlimited bandwidth interconnection, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, other suitable buses, or any combination thereof. In an appropriate case, the bus may include one or more buses. While embodiments of the present disclosure describe and illustrate a particular bus, the present disclosure contemplates any suitable bus or interconnection.

Alternatively, in conjunction with the method for locating the anomaly root cause in the above embodiments, embodiments of the present disclosure may provide a computer-readable storage medium. The computer-readable storage medium stores the computer program instructions, and the computer program instructions are executed by the processor to implement any method for locating the anomaly root cause in the above embodiments.

It is to be made clear that the present disclosure is not limited to the particular configurations and treatments described above and illustrated in the figures. For the sake of brevity, detailed descriptions of known methods are omitted herein. In the above embodiments, a count of specific operations is described and shown as examples.

However, the method process of the present disclosure is not limited to the specific operations described and illustrated, and a person skilled in the art may, after appreciating the spirit of the present disclosure, make various changes, modifications, and additions, or change the order between them.

The functional blocks shown in the above-described architectural block diagrams may be implemented as hardware, software, firmware, or a combination thereof. When implemented in the hardware, the functional blocks may be, for example, an electronic circuit, an application-specific integrated circuit (ASIC), appropriate firmware, plug-ins, a function card, or the like. When implemented in the software, the elements of the present disclosure are a program or a code segment that is used to perform a desired task. The program or the code segment may be stored in a machine-readable storage medium or transmitted over a transmission medium or a communication link via a data signal carried in a carrier. The "machine-readable medium" may include any medium capable of storing or transmitting information. For example, the machine-readable medium includes an electronic circuit, a semiconductor memory device, an ROM, a flash memory, an erasable ROM (EROM), a floppy disk, a CD-ROM, a CD-ROM, a hard disk, a fiber optic medium, a radio-frequency (RF) link, etc. The code segment may be downloaded via a computer network such as the Internet, an Intranet, etc.

It should also be noted that the exemplary embodiments referred in the present disclosure describe a plurality of methods or systems based on a series of operations or devices. However, the present disclosure is not limited to the order of the operations mentioned above, that is to say, the operations may be performed in the order mentioned in the embodiments, in a sequence different from the sequence in the embodiments, or several operations may be performed simultaneously.

The above descriptions is only a specific implementation of the present disclosure, and it is clear to those skilled in the field to which it belongs that, for the sake of convenience and conciseness of the description, the specific working processes of the systems, modules, and units described above can be referred to in the preceding method implementation examples corresponding processes in the examples, and will not be repeated herein. It should be understood that the range of protection of the present disclosure is not limited herein, and that any person skilled in the art can readily think of a variety of equivalent modifications or substitutions within the range of the technology disclosed herein, all of which should be covered by the present disclosure.

What is claimed is:

1. A method for locating an anomaly root cause, comprising:

obtaining an anomaly indicator of a target system;

obtaining a data item set based on the anomaly indicator;

obtaining a first sample and a second sample corresponding to each data item of the data item set based on a time node when the anomaly indicator appears, wherein the first sample is a set of data items corresponding to the data item within a preset time period before the time node, and the second sample is a set of data items corresponding to the data item at the time node and within a preset time period after the time node;

determining an anomaly data item based on data fluctuation information of each first sample and each second sample, including: determining an average value of data items of the first sample; obtaining a first sample dispersion and a second sample dispersion by determining a dispersion of the first sample and a dispersion of the second sample relative to the average value of the data items; in response to determining that the first sample dispersion is greater than or equal to the second sample dispersion, the data item being a non-anomaly data item; in response to determining that the first sample dispersion is smaller than the second sample dispersion, determining whether the data item is the anomaly data item based on a maximum dispersion of the first sample and a mean deviation of data items of the second sample;

obtaining an anomaly field corresponding to the anomaly data item based on the anomaly data item;

locating an anomaly root cause of the target system based on the anomaly field;

determining an anomaly root cause type based on the anomaly root cause, the anomaly root cause type including a data anomaly and a business anomaly;

in response to determining that the anomaly root cause type is the data anomaly, blocking a communication port accessed by a first preset user, the first preset user being an end user who directly uses the target system to receive services; and in response to determining that the anomaly root cause type is the business anomaly, only opening a communication port operated by a second preset user, the second preset user being an administrator, an operator, or business personnel of the target system.

2. The method of claim 1, wherein the obtaining a data item set based on the anomaly indicator includes:

determining whether the anomaly indicator is a derived indicator;

in response to determining that the anomaly indicator is the derived indicator, obtaining the data item set by disassembling the anomaly indicator according to a calculation rule of the anomaly indicator; and in response to determining that the anomaly indicator is not the derived indicator, determining the anomaly indicator as the data item set.

3. The method of claim 1, wherein the in response to determining that the first sample dispersion is smaller than the second sample dispersion, determining whether the data item is an anomaly data item based on a maximum dispersion of the first sample and a mean deviation of the data items of second sample includes:

in response to determining that the maximum dispersion is greater than or equal to the mean deviation of the data items, the data item being the non-anomaly data item; and in response to determining that the maximum dispersion is less than the mean deviation of the data items, the data item being the anomaly data item.

4. The method of claim 1, wherein the obtaining an anomaly field corresponding to the anomaly data item based on the anomaly data item includes:

obtaining an original field of the anomaly data item based on a data warehouse detail table corresponding to the anomaly data item;

obtaining a dimension field and a calculated field by disassembling the original field based on a preset rule;

in response to determining that the calculated field is a single field, determining the calculated field as the anomaly field;

in response to determining that the calculated field is a multiple field, obtaining a third sample and a fourth sample corresponding to each calculated field, wherein the third sample is a set of fields corresponding to the calculated field within a second preset time period before the time node when the anomaly indicator appears, and the fourth sample is a set of fields corresponding to the calculated field at the time node and within a second preset time period after the time node; and determining an anomaly field of the calculated field based on data fluctuation information of each third sample and each fourth sample.

5. The method of claim 1, wherein the locating an anomaly root cause of the target system based on the anomaly field includes:

locating the anomaly root cause in the target system based on a mapping relationship between a database corresponding to the anomaly field and the target system.

6. A device for locating an anomaly root cause, comprising:

a first obtaining module configured to obtain an anomaly indicator of a target system;

a second obtaining module configured to obtain a data item set based on the anomaly indicator;

a determination module configured to obtain a first sample and a second sample corresponding to each data item of the data item set based on a time node when the anomaly indicator appears, wherein the first sample is a set of data items corresponding to the data item within a preset time period before the time node, and the second sample is a set of data items corresponding to the data item at the time node and within a preset time period after the time node; and determine an anomaly data item based on data fluctuation information of each first sample and each second sample, which includes: determining an average value of data items of the first sample; obtaining a first sample dispersion and a second sample dispersion by determining a dispersion of the first sample and a dispersion of the second sample relative to the average value of the data items; in response to determining that the first sample dispersion is greater than or equal to the second sample dispersion, the data item being a non-anomaly data item; in response to determining that the first sample dispersion is smaller than the second sample dispersion, determining whether the data item is an anomaly data item based on a maximum dispersion of the first sample and a mean deviation of data items of the second sample;

a third obtaining module configured to obtain an anomaly field corresponding to the anomaly data item based on the anomaly data item; and a localization module configured to locate an anomaly root cause of the target system based on the anomaly field, wherein the determination module is further configured to:

determine an anomaly root cause type based on the anomaly root cause, the anomaly root cause type including a data anomaly and a business anomaly;

in response to determining that the anomaly root cause type is the data anomaly, block a communication port accessed by a first preset user, the first preset user being an end user who directly uses the target system to receive services; and in response to determining that the anomaly root cause type is the business anomaly, only open a communication port operated by a second preset user, the second preset user being an administrator, an operator, or business personnel of the target system.

7. An electronic device, comprising at least one processor, at least one memory, and computer program instructions stored in the at least one memory that, when the computer program instructions are executed by the at least one processor, direct the at least one processor to perform the method of claim 1.

8. The method of claim 1, further including:

in response to determining that the target system is a banking system and the anomaly root cause type is the data anomaly, isolating a data storage node in the target system that has the anomaly root cause.

9. The method of claim 1, further including:

in response to determining that the target system is a banking system and the anomaly root cause is the business anomaly, isolating a business processing node in the target system that has the anomaly root cause.

10. The method of claim 1, wherein a determination of the preset time period includes:

determining the preset time period based on a data item characteristic of the each data item and a system characteristic of the target system, the data item characteristic of the each data item including at least one of a data acquisition volume, a data updating frequency, and an updating heat cycle of the each data item, the system characteristic of the target system including at least one of a data acquisition volume, a system load, and a network load of the target system.

11. The method of claim 1, wherein the determining an anomaly data item based on data fluctuation information of each first sample and each second sample further includes:

for the each data item in the data item set, determining a first anomaly degree of the data item based on the data fluctuation information;

determining a predictive set of data items corresponding to the data item within the preset time period after the time node by processing the first sample based on a fluctuation prediction model, the fluctuation prediction model being a trained machine learning model;

determining a second anomaly degree of the data item based on the predictive set of data items and the second sample;

determining a comprehensive anomaly degree based on the first anomaly degree and the second anomaly degree; and determining the anomaly data item based on the comprehensive anomaly degree of a plurality of data items of the data item set.

12. The method of claim 11, wherein the determining a comprehensive anomaly degree based on the first anomaly degree and the second anomaly degree includes:

determining a predictive fluctuation characteristic based on the first sample and the predictive set of data items;

determining a first weight corresponding to the first anomaly degree and a second weight corresponding to the second anomaly degree based on the predictive fluctuation characteristic; and determining the comprehensive anomaly degree based on the first anomaly degree, the first weight, the second anomaly degree, and the second weight.

13. The method of claim 11, wherein the fluctuation prediction model includes a plurality of different specific models, and each specific model refers to a fluctuation prediction model for a particular anomaly indicator.

* * * * *